Patented June 10, 1952

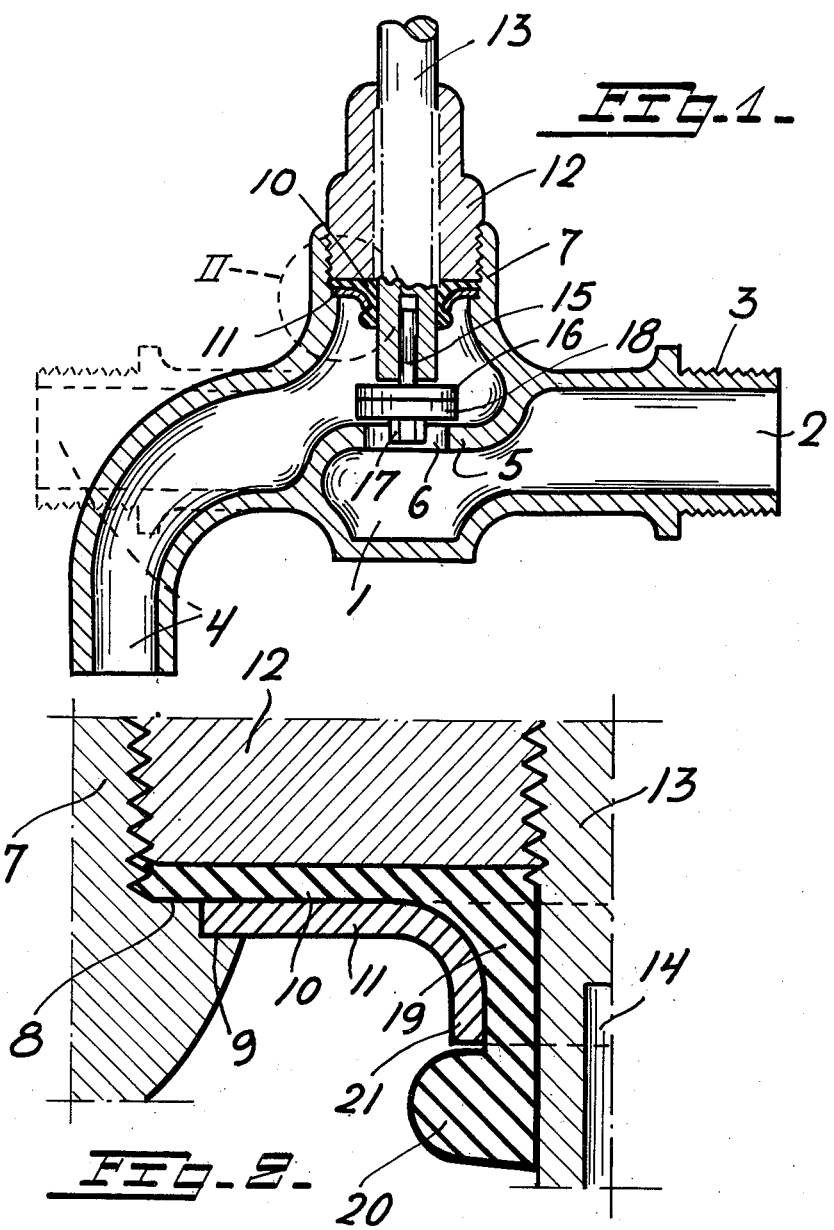

2,600,293

UNITED STATES PATENT OFFICE 2,600,293

TAP OR COCK

Halvor Heldal, Nesttun near Bergun, Norway

Application May 27, 1949, Serial No. 95,787
In Norway April 4, 1948

2 Claims. (Cl. 286—26)

This invention relates to improvements in taps or cocks, particularly in which a screw spindle extends through a stuffing box at the top of the body of said tap or cock, to engage a seat valve, which is moved to and from its seat by manoeuvring said spindle for regulating or shutting off the flow of fluid.

Even if such taps are fitted with a stuffing box around the valve spindle, there will be a more or less heavy leakage along the spindle after the tap or cock has been in use for some time, as experience has shown it is difficult to make the tap or cock fit tightly at this point, especially with regard to hot water or steam taps or cocks as such leakage can be unpleasant.

The object of the present invention is to overcome this disadvantage of the aforementioned taps or cocks, and the improvement according to the present invention is characterised therein, that between a screwed housing in the body of the tap or cook, through which housing the manoeuvring spindle is screwed, there is inserted packing means, which extends radially from said spindle and axially along same and which is supported in the radial as well in the axial directions by a washer device which rests against a seat in the body of the tap or cock.

A packing is thus formed which is supported from both sides as well in its radial and axial directions, so that a leakage proof carriage of the manoeuvring spindle of the valve is ensured.

Further characteristic features will be revealed in the following.

One embodiment of the invention is shown in the annexed drawing, wherein:

Figure 1 is a vertical, longitudinal section through a water tap of the known type, embodying a packing according to the invention, and Figure 2 shows on an enlarged scale a vertical section through the encircled part of Figure 1 and which is indicated at II.

In the drawing, 1 indicates the body of the tap, which may be of any previously known type, with an inlet 2 at one end which is fitted with internal or external threads 3 for coupling to a pipe not shown. It further has an outlet 4, which may have a shape suitable for any particular purpose, thus it may be shaped in the same way as the inlet, as shown by the dotted lines, in order that the tap may be coupled in series with a pipe line. In the body 1 there is a wall 5 extending transversely across the flow of fluid from the inlet to the outlet, and which has a valve opening 6.

Above the valve opening 6 an internal threaded boss 7 is formed in the body, which is provided with abutment means, for supporting special packing means, shown as comprising two inwardly turned and terraced seats 8 and 9. Upon the upper seat 8 rests a washer shaped packing 10, and under same rests upon the lower seat 9 a metal washer 11. In the boss 7 a housing 12 is screwed, which has a pressing face adapted to act against the top of the packing 10 and press same down against its seat 8 and the washer 11, so that the packing 10 will expand radially and cause its outer circumference to be pressed into the threads of the boss and its inner circumference to be pressed against the valve spindle 13, which extends through the central opening of the packing. The spindle is screwed centrally through the housing 12 and has at its upper end a handgrip, not shown, and its lower end an axial bore 14 to receive a centrally arranged seat valve 15. This is formed with a washer 16, against which by means of a nut 17 a packing 18 is attached and which forms the valve disc itself.

With the pressure fluid passing through the inlet 2 and the spindle 13 screwed upwards through the housing 12, the valve will be raised from its seat by the pressure fluid, and there is thus an open connection through the opening 6 to the outlet 4.

As will be seen from Figure 2 of the drawing the packing 10 has a special shape, viz. from the flat, washer-shaped, radial part 10 there extends in an axial direction around the spindle 13 a sleeve shaped elongation 19 which fits tightly around the lower smooth turned part of the spindle, and which at the lower end merges into a bulge 20. The half cross-section through the packing shows an L-form in reverse. The metal washer 11 has a substantially similar shape. Its radial part 11 having a sleeve shaped elongation 21, which fits tight around the packing elongation 19, and which lies right against the upper edge of the bulge 20, whereby the packing embodying the parts 10, 19 is supported both in radial and axial directions.

By the arrangement of this improved packing and the support the washer 11 gives the packing, the pressure fluid is prevented from forcing its way up through the threads between the housing 12 and the boss 7, and the housing and the spindle 13. Thus an absolutely leak-proof joint, where the pressure fluid cannot penetrate upwards, is obtained.

In the preferred form, as best shown in Fig. 2, the washer 11 has between its longitudinally and radially extending portions 21 and 11 an inwardly and downwardly inclined or contracting throat portion, shown as a curved throat. The molded compressible body or packing is provided between its downwardly and radially extending portions 19 and 10 with a downwardly tapering portion, shown as a fillet, which fits in the downwardly contracting portion of the washer. Thus, in this construction, the pressing face of the spindle housing 12, engaging the upper side of the compressible body, acts to force the tapered portion of the body downwardly within the downwardly inclined washer throat, thus further tighening the packing as its flange-like portion is compressed.

In addition, it will be appreciated that the terracing of the seats 8 and 9, and the extension of the flange-like portion 10 of the packing across the joint between washer 9 and the washer seat, affords an especially effective seal above the washer 11.

The bulge 20 has the effect that the packing at this point fits tightly and elastically around the spindle. In addition, when the bulge 20 is used, this element, in cooperation with the flange 10, secures the packing and washer in assembled relation. The packing may of course be without such bulge, and the elongation 21 of the washer 11 in that case may have the same or approximately the same axial length as the elongation 19 of the packing 10.

I claim:

1. A cock of the type that comprises a body portion having a threaded boss therein, a threaded spindle housing engaging said threaded boss, a valve spindle threadedly engaged in said spindle housing, and a spindle packing about said spindle; said cock having its threaded boss provided with upwardly facing annular abutment means in concentric spaced relation to said spindle; said spindle packing comprising a molded compressible body embracing said spindle and having a longitudinal sleeve-like portion extending downwardly along said spindle and a radial flange-like portion extending from said spindle into overlying relation to said annular abutment means; said cock further comprising a metal washer supporting said molded packing and comprising a longitudinal sleeve-like portion extending downwardly about the sleeve-like portion of said compressible body and pressing it snugly against said spindle, and a radially extending flange-like portion underlying the flange-like portion of said compressible body and supported on said annular abutment means; said spindle-housing having a pressing face engaging the upper side of said compressible body and compressing the same against said washer for forcing said compressible packing into tight engagement with said threaded boss, said washer, and said spindle; and said annular abutment means comprising a lower annular seat and an upper annular seat spaced longitudinally by a distance equal to the thickness of said washer, said lower annular seat and washer being of less radius than said upper annular seat, said washer being supported in said lower annular seat, and the radial flange of said packing extending across said washer and into overlying relation to said upper annular seat.

2. A cock of the type that comprises a body portion having a threaded boss therein, a threaded spindle housing engaging said threaded boss, a valve spindle threadedly engaged in said spindle housing, and a spindle packing about said spindle; said cock having its threaded boss provided with upwardly facing annular abutment means in concentric spaced relation to said spindle; said spindle packing comprising a molded compressible body embracing said spindle and having a longitudinal sleeve-like portion extending downwardly along said spindle and a radial flange-like portion extending from said spindle into overlying relation to said annular abutment means; said cock further comprising a substantially rigid metal washer supporting said molded packing and comprising a continuously annular longitudinal sleeve-like portion extending downwardly about the sleeve-like portion of said compressible body and in continuous contact therewith and pressing it snugly against said spindle, and a continuously annular radially extending flange-like portion underlying and in continuous contact with the flange-like portion of said compressible body and supported on said annular abutment means; and said spindle-housing having a pressing face engaging the upper side of said compressible body and compressing the same against said washer for forcing said compressible packing into tight engagement with said threaded boss, said washer, and said spindle; said washer having between its longitudinally and radially extending portions a continuously annular inwardly and downwardly contracting portion; said compressible body being provided between its downwardly and radially extending portions with a downwardly tapering portion fitting in and continuously contacting the downwardly contracting portion of said washer; said pressing face engaging the upper side of said compressible body acting to force said tapered portion downwardly into said inwardly and downwardly contracting washer portion as it compresses its flange-like portion.

HALVOR HELDAL.

REFERENCES CITED

The following references are of record in the file of this patent:

UNITED STATES PATENTS

| Number | Name | Date |
|---|---|---|
| 1,850,566 | Roed | Mar. 22, 1932 |
| 1,937,246 | Reedy | Nov. 28, 1933 |
| 2,202,908 | Hubbard | June 4, 1940 |
| 2,208,482 | Victor | July 16, 1940 |

FOREIGN PATENTS

| Number | Country | Date |
|---|---|---|
| 437,477 | Great Britain | Oct. 30, 1935 |